United States Patent [19]
Hosoe et al.

[11] 4,104,650
[45] Aug. 1, 1978

[54] SHARP FOCUS DETECTING SYSTEM

[75] Inventors: Kazuya Hosoe, Machida; Seiichi Matsumoto; Shigeru Hashimoto, both of Yokohama; Tomonori Iwashita, Chofu; Tadahide Fukushima; Hideo Yokota, both of Tokyo, all of Japan

[73] Assignee: Canon Kabushiki Kaisha, Tokyo, Japan

[21] Appl. No.: 604,535

[22] Filed: Aug. 14, 1975

[30] Foreign Application Priority Data

| Aug. 16, 1974 | [JP] | Japan | 49-94369 |
| Aug. 20, 1974 | [JP] | Japan | 49-95167 |
| Aug. 20, 1974 | [JP] | Japan | 49-95168 |
| Aug. 30, 1974 | [JP] | Japan | 49-100154 |

[51] Int. Cl.² .............................................. G03B 7/08
[52] U.S. Cl. ...................................... 354/25; 354/56; 354/59; 354/225
[58] Field of Search ............... 354/25, 56, 53, 59, 354/195, 197, 224, 225; 352/140

[56] References Cited

U.S. PATENT DOCUMENTS

| 3,820,129 | 6/1974 | Hosoe et al. | 354/25 |
| 3,827,064 | 7/1974 | Kiyohara et al. | 354/25 |
| 3,830,571 | 8/1974 | Imai et al. | 354/25 X |
| 3,868,711 | 2/1975 | Sekida et al. | 354/219 |
| 3,940,777 | 2/1976 | Komine | 352/140 X |
| 3,950,764 | 4/1976 | Hosoe et al. | 354/25 |
| 3,967,299 | 6/1976 | Shono | 354/219 |

Primary Examiner—John Gonzales
Attorney, Agent, or Firm—Toren, McGeady and Stanger

[57] ABSTRACT

A camera having an objective and visual or automatic focusing means for the objective. For assistance in bringing into sharpest focus an image of an object formed by the objective at the focal plane of the camera, there is provided a sharp focus detecting apparatus constructed in the form of an attachment unit attachable to and detachable from the camera and essentially comprising an optical system subsidiary to the objective, photoelectric means arranged upon receiving light coming from the object through the objective and subsidiary optical system for producing an electrical output signal proportional to the degree of sharpness of the image and oscillatory motion imparting means or scanning means associated with the photoelectric means for periodically varying the spatial relationship along the projection path between the photoelectric means and the subsidiary optical system.

26 Claims, 24 Drawing Figures

SHARP FOCUS DETECTING SYSTEM

BACKGROUND OF THE INVENTION

1. Field of the Invention

This invention relates to systems for detecting the condition of sharp focus when an image-forming optical system is focused for differing object positions, and, more particcularly, to a sharp focus detecting system of the type in which a real image formed by the image-forming optical system, or an image equivalent thereto is scanned by an ever-oscillating photoconductive cell to measure the degree of sharpness of the image.

2. Description of the Prior Art

For detection of the condition of sharp focus when an image-forming optical system is focused for differing object positions by utilizing nonlinear light response characteristics (called photoelectric effect) of the kind which is unique in the case of photoconductive materials such as cadmium sulfide and cadmium selenide, there is known an arrangement in which a photoconductive element having a light sensitive image receiving surface positioned in a plane at which a real image of an object is formed in sharp focus by the image-forming optical system cooperates with a scanning device such as oscillatory motion imparting device to scan the real image across the image plane. In this manner, the degree of sharpness of the image can be measured with high accuracy. Various methods of, and apparatus for detecting the condition of sharp focus for an image-forming optical system based on the principle of this arrangement have been proposed, and some of them have already put into practice, as disclosed, for example, in Japanese patent publication No. 40-4788 assigned to the assignee of the present invention, U.S. Pat. No. 3,511,155 granted to Yamada, and U.S. Pat. No. 3,720,151 granted to Katsuyama.

Japanese patent publication No. 40-4788 provides a method of detecting whether or not an image-forming optical system is in sharpest focus for a given object comprising projecting a real image of the object through the image-forming optical system onto the light sensitive surface of a photoconductive element, oscillating the photoconductive element as passing through a critical focal plane to vary the length of the projection path between the optical system and the photoconductive element. In this manner, pulsating current is introduced into the fundamental output of the photoconductive element, and sensing the direct-current component of the resultant output of the photoconductive element.

U.S. Pat. No. 3,511,155 concerns an automatic focusing apparatus for use in an optical instrument such as a camera employing a sharp focus detecting method which comprises forming a real image of an object with projection light passing through an optical system on a light sensitive surface of a cadmium sulfide element positioned at a plane conjugate to the focal plane of the camera and fixedly mounted on a pivotal support plate, imparting periodic pivoting movement to the support plate to oscillate the CdS element at a frequency of several tens of cycles along the optical axis, and sensing a pulse produced each time the CdS element surface passes through the plane of focus to control operation of a servo motor. The optical system is therefore automatically focused to the object.

U.S. Pat. No 3,720,151 concerns a modification of the automatic focusing apparatus disclosing in the above-identified U.S. Pat. No. 3,511,155. In this arrangement the CdS element is fixedly secured in position being conjugate to the focal plane, an optical path length varying lens assembly comprising concave and convex lenses in employed as arranged in front of the CdS element. With this arrangement, the image plane is caused to oscillate with respect to the CdS element by imparting symmetrical oscillation of predetermined period into the concave and convex lenses along the optical axis thereof.

The apparatus employing such methods are characterized by an interpolation between two bracketing conditions of focus which is effected by imparting periodic variation to the spatial relationship between the photoelectric element capable of sensing the degree of sharpness of an image and the focal plane at which a real image of an object is formed by an image-forming optical system. Such apparatus has not only an advantage of realizing condition of optimum focus condition with a relative high degree of dependability even from the theoretical point of view, but also an advantage of facilitating the measurement of the degree of focus of an image in association with the direction in which an adjustment must be made to bring the image into focus.

In application to optical instruments such as photographic cameras at the automatic sharp focus detecting apparatus or automatic focusing apparatus thereof, however, various problems are encountered wherein the apparatus is incompatible with relatively simple camera structures. Such apparatus also takes up a large amount of space, and is not readily adapted to relatively low unit cost production.

On the other hand, at present, in the case of high performance single lens reflex cameras, state-of-the-art systematization is proficing an ever-increasing number of attachment which serve as the exchangeable components of the camera. By suitable selection of these units for association with the camera, it is made possible to impart desired capabilities to the camera. With respect to such optical instruments having available a number of exchangeable components, it is preferable to provide sharp focus detecting apparatus of the type described, or automatic focusing apparatus having an identical function thereto in the form of an exchangeable component constituting one of these component to overcome the above mentioned drawbacks.

SUMMARY OF THE INVENTION

Accordingly, the present invention has for a general object the provision of a noval sharp focus detecting system which eliminates all of the above mentioned conventional drawbacks which are encountered in the prior art sharp focus detecting apparatus or automatic focusing apparatus.

An object of the invention is the provision of a sharp focus detecting apparatus and/or a focusing apparatus in the form of an attachment unit or units adapted for use as an exchangeable component of an optical instrument, or otherwise the optical instrument is susceptible to relative complexity in structure, and increases in dimensions and in production cost.

Another object of the invention is the provision of an apparatus making it possible to detect the st focus condition of an image forming optical system and adapted to the purpose of assisting toward far-advancing systematization of an optical instrument with a supplement of various exchangeable components.

In particular accordance with the foregoing objects, a preferred embodiment of the invention in view, for example, of a single lens reflex camera systematized with a supplement not only of a series of interchangeable objective lenses but also of a series of interchangeable view finder units, provides an apparatus making it possible to detect the best focus condition of the individual interchangeable objective lens and constructed in such a form as incorporated in view finder unit. Taking into account the fact that the series of interchangeable objective lenses for the above-identified camera is characterized by a set of different focal lengths, another preferred embodiment of the invention provides a method of compensating a deviation of the sensitivity of the sharp focus detecting apparatus introduced by employment of a different focal length objective lens.

Still another preferred embodiment of the invention in particular accordance with the foregoing objects provides an automatic focusing apparatus for an image-forming optical system comprising a first apparatus unit for measuring the degree of sharpness of an image formed by the optical system and a second apparatus unit independent of the first unit and responsive to the output signal from the first unit for driving the image-forming optical system in a manner to automatically adjust the focus of the image.

For assistance in further broadening the capabilities of an optical instrument systematized with a supplement of various exchangeable component units, another preferred embodiemnt of theinvention in particular accordance with the foregoing objects provides a sharp focus detecting apparatus in the form of an exchangeable component unit constituting part of an automatic focusing apparatus and having input and output terminals arranged upon connection to respective output and input terminals of another component thereof for establishing signal communication channels therebetween.

A further object of the invention is to provide a novel method of scanning an image by a photoconductive element to adjust the focus of the image with improved accuracy and reliability, and to provide a sharp focus detecting apparatus employing the same and constructed in the form particularly well adapted to wide extension of the optical instrument in systematization with a supplement of various exchangeable components.

In accordance with this object, a preferred embodiment of the invention provides means for removing foreign factors such as noise from the output signal of the photoconductive element by comparing the output with the reference signal.

Other objects and features of the present invention will become apparent from the following description taken in conjunction with the accompanying drawings in which:

BRIEF DESCRIPTION OF THE DRAWINGS

FIG. 1 is schematic diagrams showing a method of detecting the sharp focus condition of an image-forming lens which is employed in the present invention, wherein FIGS. 1(a), 1(b) and 1(c) show three different focusing positions of the image forming lens where a real sharp image of a stationary object is formed respectively at, behind and in front of a light sensitive surface of a photoconductive element capable of sensing the degree of sharpness of the image, and FIG. 1(d) is a curve showing the variation in the output of the photoconductive element under different conditions of focus.

FIG. 3 shows the operation of the sharp focus detecting system of the type of FIGS. 1 and 2 as function of time, wherein FIG. 3(a) is a wave form of oscillatory motion imparted to the photoconductive element, and FIGS. 3(b) through 3(h) are various wave forms of signals occurring in some of the blocks of the system.

DETAILED DESCRIPTION OF THE PREFERRED EMBODIMENTS

Figure 1:
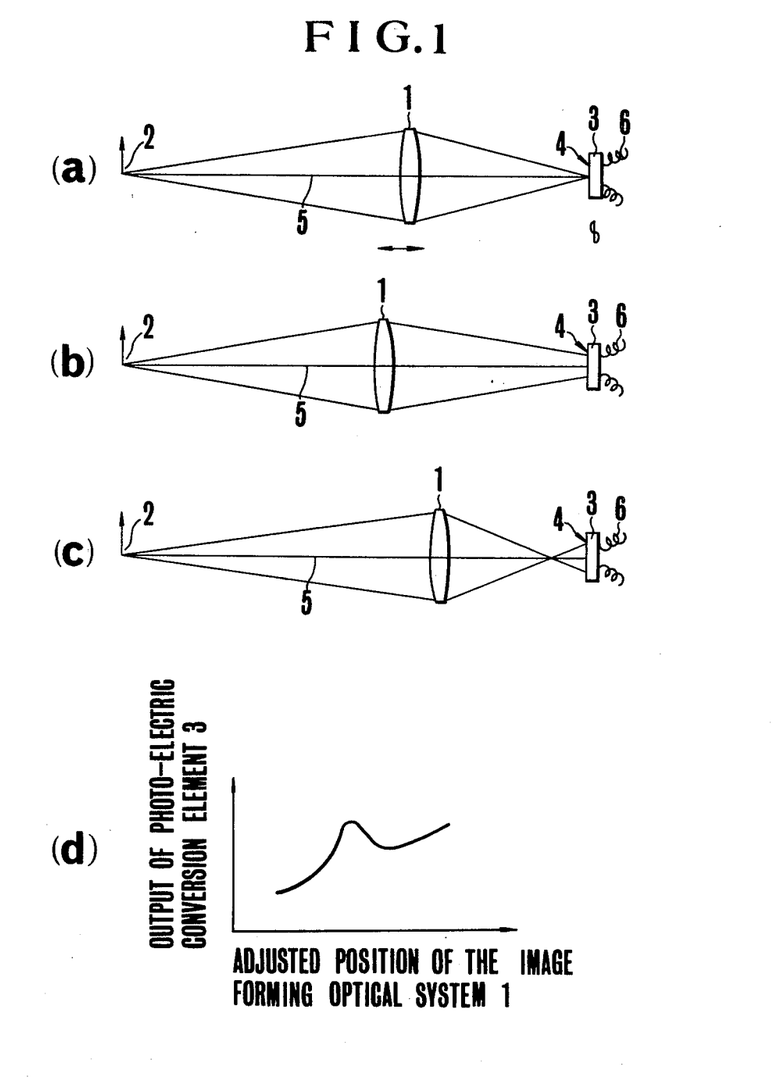

Referring to FIG. 1, there is shown an object 2 of which an image is to be formed by means of a lens 1 movable along an optical axis 5 for focusing purposes. A photoelectric element 3 is provided for sensing the sharpness of the image, as the light sensitive image receiving surface 4 of element 3 is oriented transverse to the optical axis 5 and is positioned to receive at least part of the image formed by the lens 1. Assuming that the lens 1 is adjusted to a focusing position intermediate within the focusing range as illustrated in FIG. 1(a) where the plane of focus coincides with the light sensitive surface 4 of element 3, when the lens 1 is adjusted to a focusing position at either of the ends of the focusing range as shown in FIGS. 1(b) and 1(c), the plane of focus is displaced either rearward or forward from the surface 4 of element 3 respectively, thereby causing the lack of focus on the surface 4 with the result that the distribution of light incident on the surface 4 is varied from that occuring when a sharp image is formed thereon. In the case of the sensing element 3 made of photoconductive material such as cadmium sulfide (CdS), when the degree of sharpness of an image of an object on the photoconductive surface 4 reaches a maximum level, a peak value of conductance is achieved, as shown in FIG. 1(d), wherein the abscissa may be considered as the position of the plane of focus, and the ordinate as the conductance of the photoconductive material, or the electrical output thereof as it is energized. As a matter of fact, such nonlinear light response characteristics of the photoconductive element can be utilized in detecting a condition of sharpest focus for an image-forming optical system as a result of photoelectrically measuring the degree of sharpness of an image, and, if necessary, in automatic focusing of an optical instrument such as a camera.

Since the phenomenon of photoelectric image sharpness recognition by the surface of photoconductive element depends only on the light distribution thereon, the photoconductive element may be moved through the image plane to indicate whether or not the image is in sharpest focus on the image plane.

The present invention utilizes the characteristics of the photoconductive element and contemplates to impart oscillatory movement, for example, of sinusoidal wave form to the photoconductive element 3 at a suitable oscillation frequency as represently indicated in FIG. 1(a). The amplitude of oscillation of the element 3 is such that a sharpest image can be found on the light sensitive image receiving surface of the photoconductive element at a location within the range of movement thereof as the focusing member of an optical lens system is moved from one end to the other of the focusing range, for example to effect focusing from an object at a distance of one meter to an infinite object, or vice versa. This method of detecting a condition of sharpest focus further includes steps of sensing periodic variation in the output of the element produced by the periodic variation in the light distribution on the surface, and detecting a peak value of the output of the element, while adjusting the position of the focusing member of the optical lens system.

Figure 2:
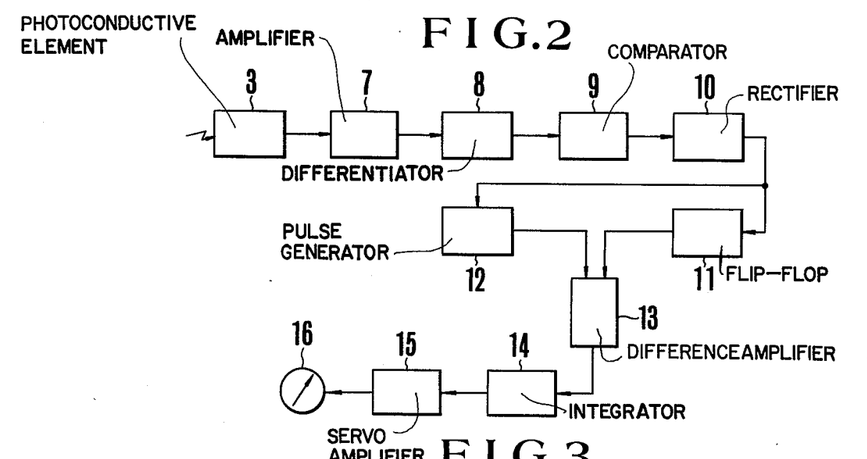
FIG. 2 is a block diagram showing an arrangement of the essential parts of electrical circuitry suitable for use in a sharp focus detecting system employing the method of FIG. 1.
Figure 3:
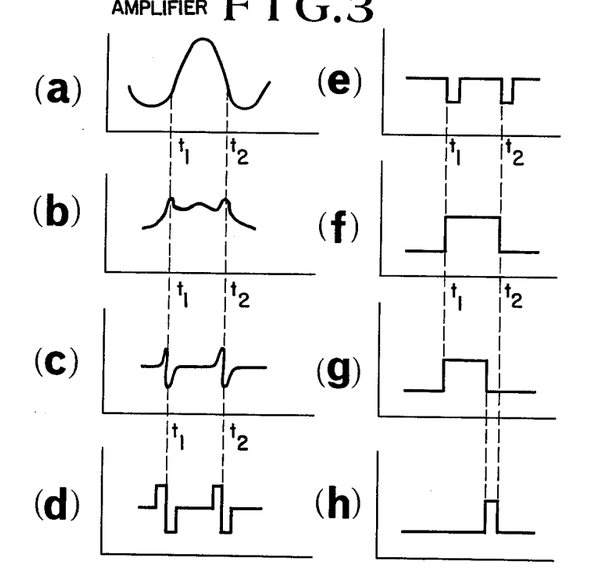

As shown in FIGS. 2 and 3, a sharp focus detecting system employing the above mentioned method essentially comprises the following components of which functions will be explained in connection with an arrangement thereof.

The photoconductive element 3 is assumed to oscillate along the optical axis 5 of FIG. 1 at a predetermined frequency in sine wave-forming manner as shown in FIG. 3(a), wherein amplitude is plotted as the ordinate with time as the abscissa. Assuming also that the lens 1 remains stationary regardless of variation of the lens-to-object distance, and at times designated by $t_1$ and $t_2$ in one cycle, the light sensitive surface 4 of element 3 passes through the plane of sharpest focus, the voltage output of the element 3 in the form, for example, of voltage is varied as shown in FIG. 3(b), wherein and also in the following FIGS. 3(c) through 3(h), voltage is plotted as the ordinate with time as the abscissa. This output voltage after amplifed by an amplifier 7 is applied to a differentiator 8 which produces an output of wave form as shown in FIG. 3(c). For facilitating subsequent accurate electrical processing of the output of the differentiator 8, there is provided a comparator 9 for converting the wave form of FIG. 3(c) to a wave form as shown in FIG. 3(d). The output of comparator 9 is rectified by a rectifier 10 to produce a pair of negative pulses as shown in FIG. 3(e). The pulse occurring at time $t_1$ turns on a flip-flop 11 and the pulse occurring at time $t_2$ turns off the same flip-flop 11, thereby the pair of pulses is converted to a single pulse having a width equal to the time interval between the times $t_1$ and $t_2$ as shown in FIG. 3(f). Since the time period of oscillation of the photoconductive element 3 is predetermined, it is evident that the width of the pulse from the flip-flop 11 is a function of the lens-to-object distance. Now assuming that the lens 1 is movable to effect focusing to suit differing object positions, and the photoconductive element 3 is positioned with the center of oscillation of the image-receiving surface 4 thereof coinciding with the focal plane for the lens 1, when an image of a given object is in sharpest focus on the focal plane, the width of the pulse produced from the flip-flop 11 becomes equal to ½ times the time period of oscillation of the element 3. For comparing the pulse from the flip-flop 11 having a width dependent upon the position of the plane of focus with a reference pulse having a constant width equal to ½ times the period of osciolation of the element 3, there is provided a pulse generator 12 in combination with a difference amplifier 13 having inputs connected to the respective outputs of the flip-flop 11 and the pulse generator 12 and having an output connected through an integrator 14 and a servo amplifier 15 to an indicator 16 such as an ammeter. Assuming that the width of the pulse from the flip-flop 11 is shorter or longer than that of the reference pulse as shown in FIGS. 3(f) and 3(g) by a time interval, the difference amplifier 13 produces a pulse having a width proportional to this time interval as shown in FIG. 3(h), the magnitude and polarity of the signal from the difference amplifier 13 being indicated by the meter 16 as determining how much and in what direction the plane of a sharpest image of the object 2 formed by the lens 1 is displaced from the center of oscillation of the image-receiving surface 4 of the photoconductive element 3, or the focal plane for the lens 1. It is to be noted that this signal can be utilized as a control signal for automatic focusing of the lens 1. In the arrangement of FIG. 2, the output of the rectifier 10 is shown as being also applied to the pulse generator 12 so that the leading edge of the reference pulse coincides with that of the pulse from the flip-flop 11 as shown by comparison of FIG. 3(g) with FIG. 3(f).

Figure 4:
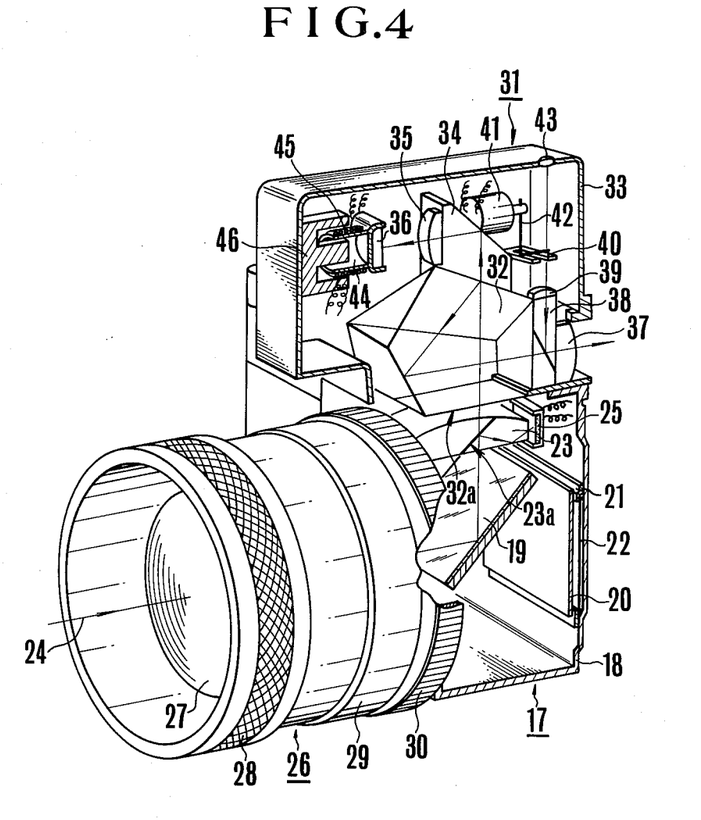
FIG. 4 is a partly perspective partly sectional view of the essential parts of a sharp focus detecting apparatus constructed in accordance with one embodiment of the present invention as incorporated in the housing of an interchangeable view finder unit of a single lens reflex camera.
Figure 5:
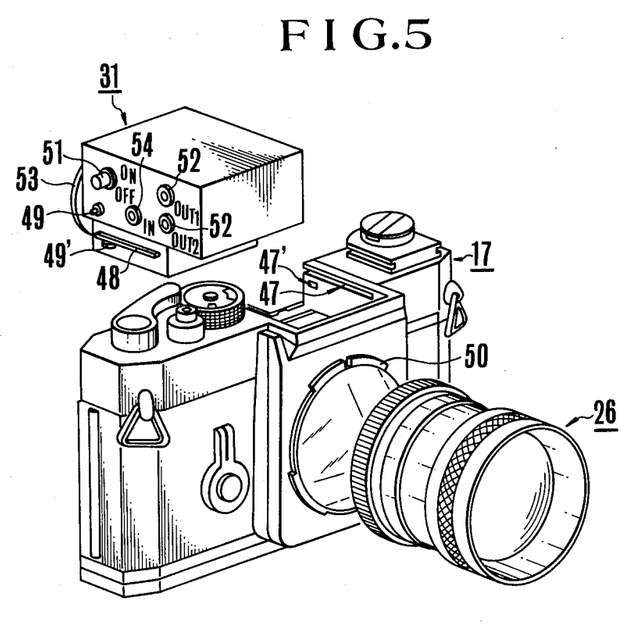
FIG. 5 is a perspective view of the view finder unit of FIG. 4 shown as being about to be attached to the camera body of FIG. 4.

Referring now to FIGS. 4 and 5, there is shown one embodiment of a sharp focus detecting apparatus according to the present invention as applied to visual focusing of a single lens reflex camera of the type in which a portion of the view finder system is made interchangeable, and a s constructed in the form of a combined attachment unit with a view finder attachment unit of the camera. The single lens reflex camera of construction known in the art comprises a camera body 17 with a housing 18 having incorporated therein a total reflection mirror 19, a focal plane shutter 20, a pair of film guide channels 21, a film 22, and a condenser lens 23 provided with an inclined half-mirrored surface 23a at a central portion thereof for deflecting part of the light reflected from the mirror 19 onto a light value sensing element 25, the same being arranged at the rear side of the condenser lens 23, and an objective lens 27 with a lens barrel 26 having a focus adjusting ring 28, a diaphragm ring 29 and an adaptor ring 30 for fixedly securing the lens barrel 26 to the camera body 17.

At the top of the camera, there is shown an attachment unit 31 with a housing 33 having mounted therein the sharp focus detecting apparatus of the invention and a roof pentaprism 32 and an eye-piece 37, the parts 32 and 37 constituting part of the view finder system of the camera. The prism 32 is arranged so that when the attachment unit is loaded on the camera body 17, the center of the area of the bottom face of the prism 32 coincides with the optical axis of the condenser lens 23, and is fixedly mounted within the housing 33 by means known in the art. In order to provide on a light sensitive image-receiving surface of a photoconductive element 36 an image of an object equivalent in sharpness to that which is to be formed on the film 12 by the objective lens 27, there is provided supplementary optical means, in this instance, a prism 34 and a plano-convex lens 35 as associated with the roof pentaprism 32. The supplementary prism 34 is arranged with the entrance face thereof being cemented together withteh roof faces of pentapriam 32 to permit at least part of the light from a finder image to be split into the supplementary prism 34 and to be directed therethrough to an exit face thereof. The supplementary plano-convex lens 35 is arranged with the plane surface thereof being cemented with the exit face of the supplementary prism 34, and the convex surface thereof facing the light sensitive surface of the photoconductive element 36. The output of the photoconductive element 36 is connected to the input of an output processing circuit in construction and arrangement to that shown in FIG. 2 and of which the output is connected to an indicator 41 having a pointer 42 cooperative with a type of reading not shown provided on an apertured plate 40. As the pointer 42 is illuminated with light entering through a window 43 provided through the wall of the top panel of the housing 33, an image of the pointer 42 can be viewed by the camera operator looking through the eye-piece 37, a glass block 38 arranged between the exit face of pentaprism 32 and the eye-piece 37 and having a half-mirrored surface provided therein and a compensator lens 39 arranged adjacent the entrance face of the glass block 38.

The photoconductive element 36 is fixedly secured to a hollow tubular support member 44 at one end thereof, the opposite end of which is movably mounted on a central projection of a permanent magnet structure 46 fixedly mounted on the housing 33. The support member 44 is provided with a coil 45 arranged on the external surface thereof and connected to a sine wave output producing circuit not shown. With this arrangement, it is possible to impart a desired oscillatory motion to the photoconductive element 36 as the magnetic field of the permanent magnet 46 interacts with a time-dependent magnetic flux induced by the current flowing through the coil 45. It is noted that the output processing circuit means described in connection with FIG. 2 is mounted together with a power source therefor within the housing 33 although not shown.

The operation of the camera equipped with the sharp focus detecting system of the invention shown in FIGS. 2, 3 and 4 is as follows. The camera operator looking through the eye-piece 37 shoots an object to be photographed. Assuming that the object lens 26 is not correctly focused for the object, the meter 41 will indicate in cooperation with the reading not only that an image of the object which is to be formed on the film 22 is not in sharpest focus, but will indicate the direction in which an adjustment of the focus-adjusting ring 28 must be made to bring the image into sharpest focus. When the sharpest focusing of the object 26 is achieved, no current flows through the meter 41 so that the pointer 42 is brought into alignment with a particluar mark in the reading, which can be viewed by the camera operator manipulating the focusing adjusting ring 28.

In FIG. 5, the attachment unit 31 of FIG. 4 is shown about to be attached to the body 17 of the single lens reflex camera of the type described at the interchangeable view finder unit thereof. The camera body 17 is provided with a pair of guide grooves 47, the only right one of which is shown in the figure, and a pair of recessed portions 47′, while the attachment unit 31 is provided with a pair of guide rails 48 arranged to slidably engage in the respective guide grooves 47 when the unit 31 is loaded onto the camera body 17, and a pair of resilient detent pins 49′ arranged to enter the respective recessed portions 47′ when the unit is seated in the correct position, thereby the unit is prevented from slipping down therefrom during use. In order to remove the once loaded unit 31 from the camera body 17, there is provided a control button 49 positioned at one side panel of the unit housing 33. Also arranged on this panel, there are a power switch control knob 51, a pair of output terminals 52 from which outputs corresponding to ever-varying conditions of focus can be taken out to control operation of, for example, a servo motor cooperating with an automatic focusing apparatus of the camera, and an input terminal 54 receptive of external information. At the rear panel of the unit housing 33, there is shown an interchangeable eye-piece 53. At the front of the camera body 17, there is also shown an objective lens mount or barrel 26 as being about to be attached to the camera body 17.

Figure 6:
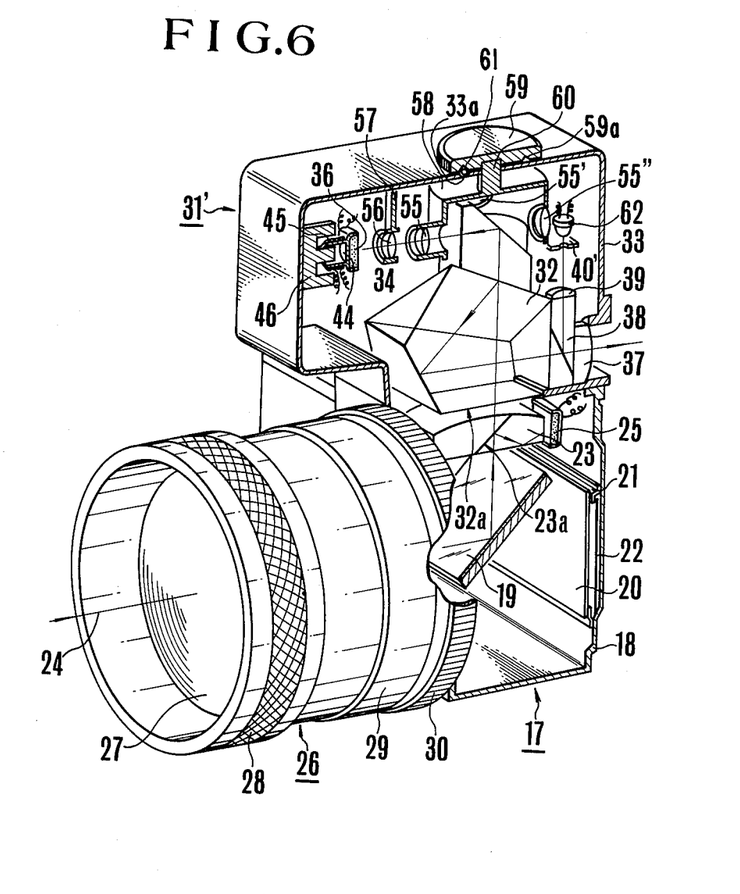
FIG. 6 is a partly perspective partly sectional view showing an example of modification of the embodiment of FIG. 4 and FIG. 5 by taking into account the different focal lengths of a series of individual interchangeable lens objectives supplied for a single camera body.

FIG. 6 shows an example of modification of the embodiment of FIGS. 4 and 5, wherein there is provided means for compensating deviation of the output of the photoconductive element 3 from the true value caused by the change in imaging performance and particularly focal length of the objective lens 27 resulting from the interchange of the individual objective lenses supplied for systematization of the camera. Since the FIG. 4 supplementary optical means is of fixed imaging performance and is associated with the interchangeable objective lens 27 of the camera for forming an image of the object on the surface of element 3, it is evident that this image is not always maintanined equivalent to an image which is to be formed on the film 22 as the objective lens 27 is interchanged to vary the imaging performance and particularly focal length thereof. In order to insure that the accuracy of the sharp focus detection is not affected by the interchange of the individual objective lenses of different performance, therefore, it is necessary for the sharp focus detecting apparatus to be provided with the compensating means of the character described above.

According to the embodiment of FIG. 6, the provision for maintaining constant the magnification of the image on the photoconductive element and the amount of displacement of the image with the entire range movement of the focusing lens member of the objective despite of change of the focal length of the objective lens is made at the supplementary plane-convex lens 35 of FIG. 4, as shown in FIG. 6, wherein the various parts of the embodiment of FIG. 4 other than the supplementary lens 35 and the indicator 41 remain substantially unchanged, and therefore the same reference numerals have been employed to denote similar parts to these unchanged parts.

Whilst the supplementary lens in the sharp focus detecting apparatus of FIG. 4 is arranged as being fixedly secured to the supplementary prism 34 in intimate contacting or cemented relation to the exit face thereof, the supplementary lens system which forms an image on the photoconductive element of FIG. 6 is arranged with its first lens element 55 being movable into or from the path of projection light of rays to the photoconductive element 36 as the objective lens 27 is interchanged, and with its second lens element 56 being stationary during the interchanging operation, the first and second lens elements 55 and 56 constituting the sharp focus detecting lens system. The second lens element 56 is fixedly mounted on a support member 57 affixed to the housing 33. The first lens element 55 together with a number of lens elements 55' and 55" having different dioptric powers from each other and from that of element 55 are mounted in respective holes provided through the peripheral wall of a rotary support member 58 arranged to be rotatable about a vertical axis so that each of the lens elements 55, 55', and 55" is selectively positioned between the supplementary prism 34 and the first lens element 56 in the path of projection light of rays to the photoconductive element 36. The rotary support member 58 is connected to a selector knob 59 through a shaft 60 extending through a hole provided through the top wall of the housing 33. In order to facilitate the accurate positioning of the selected lens element in the projection path, there is provided a click mechanism comprising a minute steel ball 61 movably secured in a recessed portion 33a provided in the top wall of the housing 33 at a location where when one of a number of recessed portions 59a provided on the under side of the selector knob 59 is engaged with the steel ball 61, the corresponding one of the lens elements 55, 55', 55" and 55''' is in accurate optical alignment with the second lens element 56. The interchangeable first lens elements are designed to have such focal lengths and axial separations from the fixed second lens element that the magnification of the image on the photoconductive element formed by the combined optical system of the sharp focus detecting system including the first and second lens elements, the view-finder system and the objective lens is maintained constant by suitable selection of the first lens element in response to the imaging performance factors, for example, focal length of the used objective lens. With such compensating means, it is possible for the photoconductive element to sense the degree of sharpness of the image formed thereon while the degree of sharp focus detecting accuracy and dependability being not affected by the change in the focal length of the individual exchangeable objective lenses.

As the indicator for indicating the point of sharpest focus, there is employed a light-emitting diode 62 as arranged above the apertured plate 40' and connected to the output of the processing circuit of FIG. 2, so that when zero output is established in the processing circuit, the diode 62 is eenergized, the lighting-on and-off of the diode 62 being visible by the camera operator looking through the eye-piece 37. It is of course possible to arrange the diode 62 so that when the sharpest image is obtained, it is energized.

The operation of the single lens reflex camera equipped with the sharp focus detecting apparatus of FIG. 6 is as follows. While looking through the view finder, the camera operator may manipulate the focus adjusting ring 28 of the objective lens mount 26 to focus an object to be photographed, until the diode 62 is lighted off. At this time, the visual focusing procedure of the camera is completed.

Figure 7:
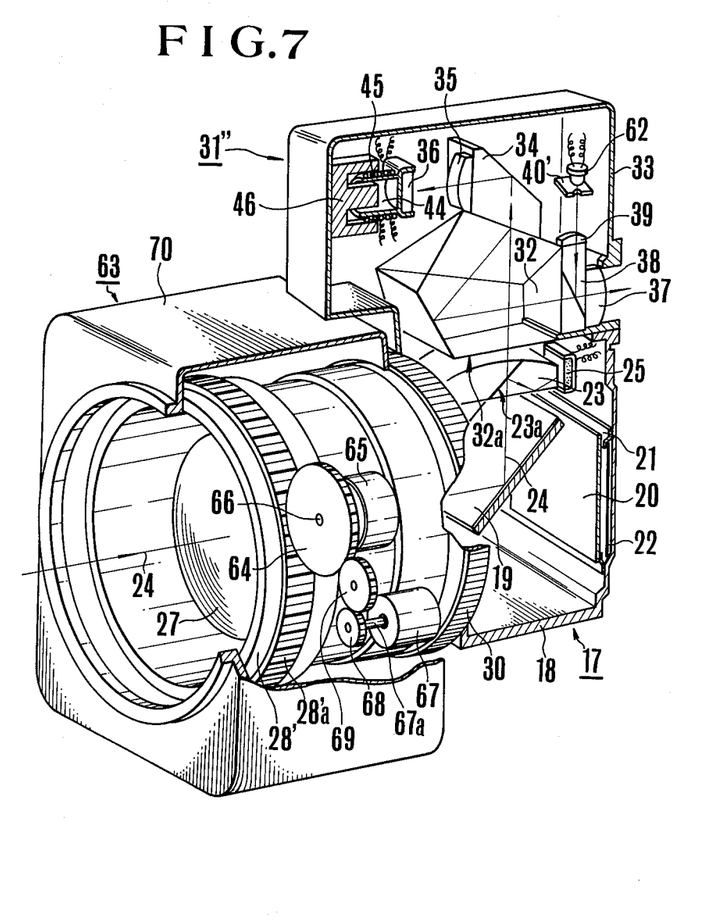
FIG. 7 is a partly perspective partly sectional view of an automatic focusing apparatus for a single lens reflex camera of the type described comprising a first attachment unit having incorporated therein a sharp focus detecting apparatus of the invention together with the view finder system thereof, and a second attachment unit responsive to the output of the first unit for driving the focusing member of an interchangeable objective lens to adjust the focus of the image at the focal plane of the camera.
Figure 8:
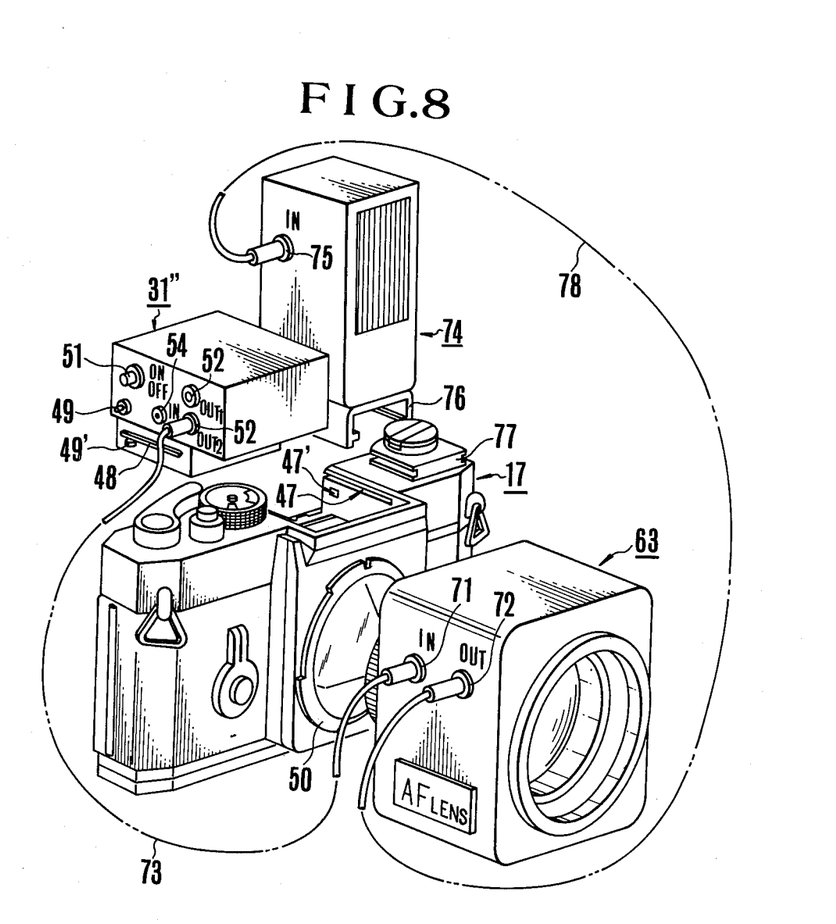
FIG. 8 is a perspective view of the first and second attachment units of FIG. 7 and a flash unit shown as being about to be attached to a camera body of FIG. 7.

FIGS. 7 and 8 show an example of application of the focus detecting system of the invention to automatic focusing of a single lens reflux camera of the type described. The automatic focusing apparatus of the camera is established by assembling a first atachment unit 31" having mounted therein the sharp focus detecting apparatus of FIG. 4 with a slight modification and a second attachment unit 63 having mounted therein an objective lens and a mechanism for driving the focusing member of the objective lens. The camera body 17 of FIGS. 7 and 8 is similar in construction to that of FIGS. 4 and 5, and the first attachment unit 31" of FIGS. 7 and 8 is similar to that of FIGS. 4 and 5 only except for the use of a light-emitting diode 62 similar to that of FIG. 6 instead of the meter 41 of FIG. 4. Therefore, in FIGS. 7 and 8, the same reference characters have been employed to denote similar parts to those of FIGS. 4 and 6. The second attachment unti 63 is constructed as independent of the first attachment unit 31" and as responsive to the output signal of the unit 31" for controlling the position of the focusing lens member of the objective lens. The driving mechanism of the unit 63 comprises a reversible servo motor 67 having a winding connected to the output of the processing circuit of FIG. 2, a speed reduction gear train comprising a pinion 68 mounted on the output shaft 67a of the motor 67, an intermediate gear 69 meshing with the pinion 68 and a gear 64 meshing with the intermediate gear 69 and mounted on the rotary shaft 66 of a potentiometer 65, and a ring gear 28' of which the toothed external circumference meshes with the gear 64 and formed in the focus adjusting ring 28 of the objective lens mount 26.

As shown in FIG. 8, the second attachment unit 63 has a housing 70 provided with an input terminal 71 and an output terminal 72, the input terminal 71 being electricaly connected to the winding of the servo motor 67 and the output terminal 72 being electrically connected to the potentiometer 65. For cooperation with the first attachment unit 31", there is further provided a first connector 73 interconnecting the output and input terminals 52 and 71 of the first and second attachment units 31" and 63 respectively, and a second connector 78 interconnecting the output terminal 72 of the second attachment unit 63 and an input terminal 75 of a flash unit 74. With the second connector 78, the output of the potentiometer 65 to the flash unit 74 for controlling the amount of flash energy in accordance with the object distance as determined from the angular position of the focusing adjusting ring 28 when flash photography is carried out. The flash unit 74 has a pair of feet 76 adapted to fit a pair of shoes 77 fixedly mounted on the top panel of the camera housing 33.

The operation of the automatic focusing apparatus of FIGS. 7 and 8 is as follows. After the first and second attachment units 31" and 63 have been assembled with each other and with the camera body 17 and rendered operative, the camera operator may align the camera to an object intended to be photographed, while looking through the eye-piece 37 of the view finder thereof. When the objective lens 27 is not correctly focused to the object, the servo amplifier 15 of FIG. 2 produces an output signal of which the polarity is indicative of the direction in which the servo motor 67 must be rotated. As the output signal is supplied to the servo motor 67 through the output terminal 52, connector 73 and input terminal 71, the focus adjusting ring 28 is driven for rotation until zero output is established in the servo amplifier 15, i.e., the condition of sharpest focus is established in the camera. The termination of automatic focusing adjustment can be recognized by the camera operator as the light-emitting diode 62 is lighted off. It is to be noted that although the objective lens 27 is illustrated as unremovably incorporated in the housing of the second unit 63, it may be constructed as a component seperable from the driving mechanism therefor and from the housing of the unit 63.

The embodiment of the invention described above is very susceptible to the optical quality of all elements involved in the course of forming an image of an object on the light sensitive image receiving surface of the sensing or photoconductive element such as the objective lens, reflex mirror, supplementary optical means, refractive undulations in the intervening spaces, dust, haze, flare in the spaces, or light pleaks permitting the entrance of non-image forming light. These factors contribute in the form of noise to the incorrect output of the photoconductive element, that is, to the unsharpness of the image. A decrease in accurace of the sharp focus detection resulting from the noise becomes serious particularly in the case of the automatic focusing apparatus shown in FIG. 7. Accordingly, it is of more importance to provide a sharp focus detecting apparatus of the character making it possible for the focusing control to be unaffected by these factors.

Figure 9:
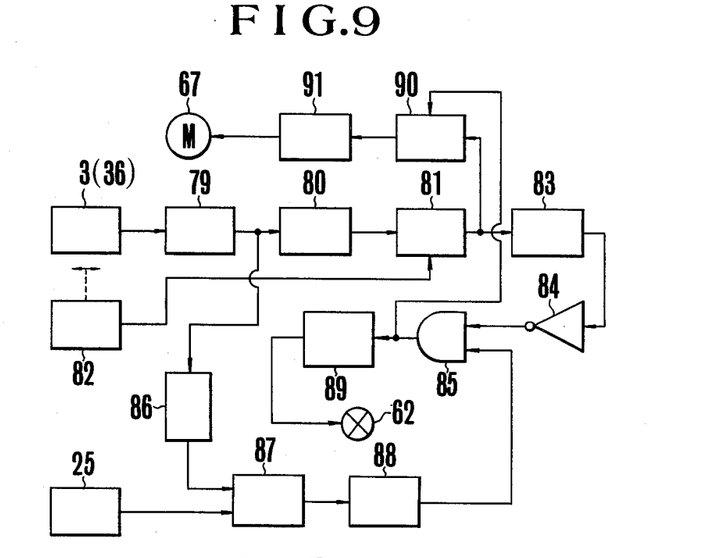
FIG. 9 is a block diagram of the essential parts of electrical circuitry of a sharp focus detecting system of the type adapted to the purpose of improving the accuracy and reliability of the sharp focus detection by comparing the output signal of the photoconductive element with a reference signal, and suitable for use in the apparatus of FIGS. 7 and 8.
Figure 10:
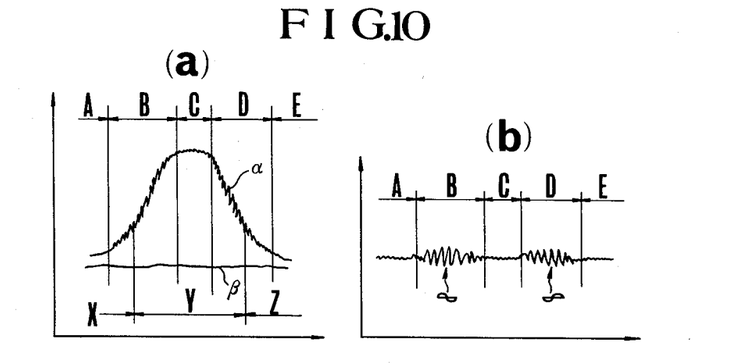
FIGS. 10(a) and 10(b) show typical examples of wave forms of the corresponding outputs of the photoconductive element 3 (36) and a band pass filter 80 of the system of FIG. 9, respectively.

Referring next to FIGS. 9 and 10, another embodiment of the present invention adapted to remove the noise by comparing the output signal of the photoconductive element with a reference signal, and particularly suited for use in the automatic focusing apparatus of FIGS. 7 and 8. The second embodiment of the invention comprises a modified type of oscillatory motion imparting means associated with the photoconductive element 3 (36) and a circuit for processing the output signal of the photoconductive element, each of which will next be described.

The oscillatory motion imparting means operates in such a manner that the light sensitive surface of the photoconductive element 3 (36) moves through the plane of focus along the optical axis 5 of FIG. 1 in perpendicular thereto and oscillates at a predetermined frequency with an amplitude far smaller than that of effecting the height of a hump in variation with image sharpness of the output of the photoconductive element as shown in FIG. 1(d). Therefore, the photoconductive element produces an output composed of a great number of minute waves superimposed on a large wave as shown in FIG. 10(a) as the focusing lens member is moved from one end region designated by A of the focusing range to the opposite end region designated by E through an intermediate region of sharp focus designated by C.

The output of photoconductive element 3 (36) after amplified by an amplifier 79 of FIG. 9 is applied to a band pass filter 80 by which the noise with the frequencies other than that of oscillation of the element 3 (36) is removed. The output of the band pass filter 80 is in thewave form shown in FIG. 10(b). The amplitudes of the waves in regions A, E and C is negligibly small as compared with those of waves in regions designated by B and D. Since the output of the photoconductive element 3 (36) sharply varies in the regions B and D, the oscillation of the element 3 (36) results in a large variation of the output thereof. Moreover, the phases of waves in the regions B and D are opposite to each other, which is detected by a phase detector 81 comparing with the phase of the output of an oscillator 82 associated with the oscillatory motion imparting means described above. The phase detector 81 is connected to a first Schmitt type trigger circuit 83 so that when the amplitude of the waves are so large as to detect the phase in the regions B and D, the circuit 83 is turned on, and when the amplitude is undetectable or zero, the circuit 83 is turned off in the regions A, E and C. The output of the phase detector 81 is also applied to a first switching circuit 90. The output of the first Schmitt type trigger circuit 83 is applied through an inverter 84 to a first input of an AND gate 85, while the other input of the AND gate 85 is connected to the output of a second Schmitt type trigger circuit 88 having an input connected to the output of a difference amplifier 87. Connected to one of the two inputs of the difference amplifier 87 is a light value sensing element 25 shown in FIGS. 4, 6 and 7. So long as the level of brightness of the object 2 is maintained constant, the sensing element 25 produces an output of constant magnitude as shown by a curve designated by beta in FIG. 10(a) despite of the fact that the degree of sharpness of the image is varied as shown by the curve designated by alpha. Connected to the other or second input of the difference amplifier 87 is a low pass filter 86 having an input connected to the output of the amplifier 79 for cutting off the minute wave component from the output therefrom, the resultant output of the low pass filter 86 becoming somewhat similar to that shown in FIG. 1(d). Responsive to a difference between the outputs of the sensing element 25 and the low pass filter 86, that is, the occurrence of a peak value in the output of the photoconductive element 3 (36), the difference amplifier 87 turns on the second Schmitt type trigger circuit 88 to produce an output which is applied to the second input of the AND gate 85. When the first and second inputs of the AND gate 85 are simultaneously in the on state, in other words, when the output of the photoconductive element is in the region C, a second switching circuit 89 is rendered operative to energize the light-emitting diode 62. In this case, therefore, the diode 62 is lighted on only when the image is in sharp focus. The output of the first switching circuit 90 is applied through an amplifier 91 to the servo motor 67 of FIG. 7, the polarity of this output indicating the direction in which an adjustment of the focusing lens member must be made to bring the image into sharp focus. Responsive to the output from the AND gate 85, the first switching circuit 90 stops the servo motor 67 from rotation. It will be appreciated that with the above mentioned circuit for processing the output of the photoconductive element, the automatic focusing control can be carried out with improved accuracy.

it will be seen from the foregoing description that the embodiments of the present invention accomplish the above mentioned objects of the invention. The advantages of the present invention may be summarized as follows. Whilst the prior art sharp focus detecting apparatus or automatic focusing apparatus is constructed as being permanently incorporated in an optical instrument with sacrificing increases in the complexity of the structure, dimensions of the apparatus itself and the production cost of the complete optical instrument, the present invention proposes to construct the apparatus in the form of an attachment unit for supplement to an optical instrument, thereby eliminating the above mentioned conventional disadvantages, and contributing to the far-reaching of the systematization as can be seen particularly in the case of single lens reflex cameras. For example, as shown in the embodiments described above, the sharp focus detecting apparatus is preferably incorporated in an interchangeable view finder unit from the point of view of compact system component of the single lens reflex camera, and cooperation with other sytem components thereof.

Further, according to the embodiment of FIG. 6, the output of the photoconductive element is compensated based on the particular imaging performance of the objective lens to maintain the accuracy of the sharp focus detection at a high level regardless of change in the imaging performance as the objective lens is interchanged. This compensating method will find wide application in the recently developed cameras for facilitating far-advanced systematization thereof.

Furthermore, according to the embodiment of FIGS. 7 and 8, the present invention facilitates the adaptation of an automatic focusing apparatus to systematized optical instruments such as cameras. As the automatic focusing apparatus is divided into a number of separate components, each of which may be interchanged to remarkably broaden the capabilities of the optical instrument and may be provided with minimized performance for minimizing the complexity of the structure and the bulk and weight thereof. Therefore, this type of automatic focusing apparatus will find wide acceptance in the art.

Furthermore, according to the embodiment of FIG. 9, the noise introduced to the output of the photoconductive element can be effectively removed by a relatively simple method for improving the accuracy and reliability of the sharp focus detection. This is very valuable in application to the automatic focusing control of optical instruments.

Certain changes may be made in the above described apparatus without departing from the scope of the invention herein involved. For example, whereas means for compensating the output of the photoconductive element in the optical form as shown is preferred, electric means such as variable resistors may be employed to effect identical results thereto. It is therefore intended that all matters contained in the above description or shown in the accompanying drawings shall be interpreted as illustrative and not in a limiting sense.

What is claimed is:

1. A focus detecting system for use with an optical instrument, comprising:
    (a) an image-forming lens system mounted on said optical instrument and arranged to be adjustable so that an image of an object is formed on a focal plane of said optical instrument, said lens system being interchangeable with another image-forming lens system having different imaging performance;
    (b) a housing adapted to be attachable to and detachable from said optical instrument;
    (c) sensing means mounted in said housing and having a light sensitive image-receiving surface transversely positioned in the path of a light projected through said optical lens system, said sensing means producing an electrical output which changes in correspondence with the change in the sharpness of the object image formed on the image-receiving surface;
    (d) means for periodically varying the substantial length of the light beam path between said lens system and said sensing means;
    (e) circuit means mounted in said housing and electrically connected to said sensing means for processing said electrical output produced therefrom to produce an electrical signal commensurate with the focusing condition of said lens system, and
    (f) compensating means mounted in said housing and arranged upon interchanging said image-forming lens system for compensating a deviation of the electrical output of the sensing means caused by the difference in the imaging performance of said image-forming lens system,
    said compensation means including a plurality of lenses having different refractive powers from one another and selecting means being mounted in said housing and arranged to be operable from the outside of said housing for selecting one of said lenses in correspondence with the imaging performance of said optical lens system for cooperation with said sensing means.

2. A focus detecting system according to claim 1, further comprising supplementary optical means mounted in said housing and arranged to direct at least a portion of the light beam coming from said object through said image-forming lens system to said image-receiving surface of said sensing means.

3. A focus detecting system according to claim 2, wherein said supplementary optical means is provided with image-forming means positioned in the path of said portion of the light beam for forming, at or near said image-receiving surface of said sensing means, an image of said object substantially equivalent to that formed by said image-forming lens system on the focal point.

4. A focus detecting system according to claim 1, further comprising a view finder system which permits viewing of said image of said object formed by said image-forming lens system from the outside of said optical instrument, at least part of said view finder system being mounted in said housing.

5. A focus detecting system according to claim 1, wherein said sensing means is provided with a photoconductive element having light response characteristics such that the conductance reaches a peak value when the degree of sharpness of said image is optimum.

6. A focus detecting system acccording to claim 1, wherein said light path length varying means includes oscillatory motion imparting means cooperative with said sensing means for imparting oscillatory motion of predetermined period to said sensing means, so that the substantial length of the light beam path between said sensing means and said image-forming lens system is varied periodically.

7. A focus detecting system according to claim 1, further comprising indicating means mounted in said housing and electrically connected to said processing circuit means for indicating information of the condition of optimum focus established in said optical instrument as said image-forming lens system is adjusted to focus said object.

8. A focus detecting system according to claim 7, further comprising optical means mounted in said housing and arranged to permit observation of information represented by said indicating means from the outside of said housing.

9. A focus detecting system according to claim 8, wherein said indicating means includes meter means responsive to the output of said processing circuit means.

10. A focus detecting system according to claim 8, wherein said indicating means includes light-emitting means responsive to the output of said processing circuit means.

11. An attachment unit for use with an optical instrument having an image-forming lens system, for detecting the focusing condition of said lens systen, said image-forming lens system arranged to be adjustable so that a first image of an object is formed on a focal plane of the instrument and arranged to be interchangeable with another image-forming lens system having different imaging performance, said attachment unit comprising:

(a) image sharpness measurement optical means cooperative with said lens system for forming on an imaging plane, a second image substantially equivalent to said first image;

(b) sensing means having a light sensitive image-receiving surface positioned at or near the imaging plane of said image sharpness measurement optical means for sensing change in the degree of sharpness of said second image, said sensing means producing an electrical output corresponding to the degree of sharpness of said second image;

(c) means for periodically varying the substantial length of the light beam path between said optical means and said image-receiving surface of the sensing means;

(d) circuit means electrically coupled to said sensing means for processing the electrical output thereof to produce a signal corresponding to the condition of focus in said optical instrument as said image-forming lens system is adjusted to focus said object;

(e) compensating optical means arranged upon interchanging said image-forming lens system for compensating a deviation of the electrical output of said sensing means caused by the difference in the imaging performance of said image-forming lens system, said compensating optical means including a plurality of lenses having different refractive powers from one another which are selectable for cooperation with said image sharpness measurement optical means in accordance with the imaging performance of said image-forming lens system associated with said optical instrument; and (f) a housing accommodating said image sharpness measurement optical means, said sensing means, said projection path length varying means, said circuit means and said compensating optical means.

12. An attachment unit according to claim 11, wherein said image sharpness measurement optical means is provided with image-reforming means arranged upon receiving of at least a portion of the light coming from said object through said image-forming lens system for forming said second image at or near said light sensitive image-receiving surface of said sensing means.

13. An attachment unit according to claim 11, further comprising optical means constituting at least a portion of a view finder system which permits viewing of said first image of said object formed by said image-forming lens system from the outside of said optical instrument.

14. An attachment unit according to claim 11, wherein said sensing means includes a photoconductive element having such light response characteristics that the conductance reaches a peak value when the sharpness of said image becomes optimum.

15. An attachment unit according to claim 11, further comprising indicating means mounted in said housing and electrically connected to said processing circuit means for indicating information of the condition of optimum focus established in said optical instrument as said image-forming lens system is adjusted to focus said object.

16. An attachment unit according to claim 15, further comprising optical means mounted in said housing and arranged to permit observation of information represented by said indicating means from the outside of said housing.

17. An attachment unit according to claim 11, further including selecting means mounted in said housing and arranged to be operable from the outside of said housing for selectively positioning one of the plurality of said lenses in the path of projection light between said image sharpness measurement optical means and said sensing means in correspondence with the imaging performance of said image-forming lens system associated with said optical instrument.

18. An adaptor unit for use with an optical instrument for detecting the focusing condition of an image-forming lens system which is adjustable along an optical axis so as to form a first image of an object on a focal plane of the instrument and interchangeable with another image-forming lens system having different imaging performance; said optical instrument being provided with a first opening adapted for conducting an image light projected by said lens system to the outside of the instrument and guide means adapted for mounting said adaptor unit on the instrument; said adaptor unit being detachably mountable on the optical instrument and comprising:

(A) a housing adapted to be detachably mounted on said optical instrument, said housing having a second opening corresponding to said first opening of the instrument for conducting the image light projected by said lens system into the housing;

(B) engaging means adapted for mounting said adaptor unit on said optical instrument, said engaging means being provided on said housing and engageable with said guide means of said optical instrument to mount the unit on the instrument;

(C) an image reforming optical system cooperative with said image-forming lens system for forming a second image of the object substantially equivalent to said first object image formed by said lens system on said focal plane, said reforming optical system being disposed within said housing and forming said second object image by the image light projected by the lens system and then conducted into the housing through said first and second openings;

(D) photoelectric detecting means for detecting the imaging condition of said second object image formed by said reforming optical system, said detecting means being disposed at least near a focal plane of the reforming optical system and producing an electrical signal corresponding to the imaging condition of the second image; and (E) electrical circuit means for processing the output signal of said photoelectric detecting means, said circuit means being electrically connected with the detecting means and producing an electrical signal corresponding to the focusing condition of said image-forming lens system to the object on the basis of said output signal of the detecting means;

said image reforming optical system including selectively changeable compensating optical means adapted for compensating the deviation of the output signal of said photoelectric detecting means caused by the difference in the imaging performances of said interchangeable lens systems, said compensating optical means comprising a plurality of optical members adapted for maintaining the magnification of said second object image at a constant value in despite of the change in the imaging performance of said image forming lens system, said optical members having different refractive powers from each other and each of the optical members being selectively disposed into the image light path toward said photoelectric detecting means in correspondence with the imaging performance of the selected lens system so as to compensate the change in the image magnification caused by the difference in the imaging performances of the lens systems.

19. An adaptor unit according to claim 18, further comprising:
selecting means for selecting one of said optical members of said compensating optical means in correspondence with the imaging performance of the selected lens system, said selecting means being operatively connected with each of said optical members and manually operable from outside said housing.

20. An adaptor unit according to claim 19, further comprising:
view finder optical means adapted for viewing said first object image formed by said image forming lens system from outside said housing, said optical means being disposed within the housing;
said image reforming optical system being cooperative with said view finder optical means so as to form said second image by the image light conducted through said second opening and said view finder optical means.

21. An adaptor unit according to claim 20, further comprising:
indicating means electrically connected with said electrical circuit means for indicating the focusing condition of said image forming lens system to the object, said indicating means being disposed at a position in which the indicating condition of the indicating means is visible from outside said housing through at least a portion of said view finder optical means.

22. A view finder adaptor unit for use with a single lens reflex camera body for detecting the focusing condition of an objective lens system which is adjustable along an optical axis so a to form a first image of an object on a film plane within the camera body and interchangeable with another objective lens system having different imaging performances; said camera body being provided with a first opening adapted for conducting an image light projected by said objective lens system to the outside of the camera body and guide means being disposed near said first opening so as to be substantially parallel to the optical axis of the objective lens system and adapted for mounting said adaptor unit on the camera body; said view finder adaptor unit being detachably mountable on the camera body and comprising:
(A) a housing adapted to be detachably mounted on said camera body, said housing having a second opening corresponding to said first opening of the camera body for conducting the image light projected by said objective lens system into the housing;
(B) engaging means adapted for mounting said adaptor unit on said camera body, said engaging means being provided on said housing and engageable with said guide means of said camera body to mount the unit on the camera body;
said adaptor unit being mountable on the camera body by a linear operation substantially parallel to the optical axis of the objective lens system through the engagement of said engaging means with said guide means;
(C) view finder optical means adapted for viewing said first object image formed by said objective lens system from outside said housing, said optical means being disposed within the housing and conducting said image light projected by said objective lens system into the housing through said first and second openings;
(D) an image reforming optical system cooperative with said view finder optical means for forming a second image of the object substantially equivalent to said first object image formed by said objective lens system on said film plane, said reforming optical system being disposed within said housing and forming said second object image by the image light projected by the lens system and then conducted into the housing through said first and second openings and said view finder optical means;
(E) photoelectric detecting means for detecting the sharpness of said second object image formed by said reforming optical system, said detecting means being disposed at least near a focal plane of the reforming optical system and producing an electrical signal corresponding to the sharpness of the second image; and
(F) electrical circuit means for processing the output signal of said photoelectric detecting means, said circuit means being electrically connected with the detecting means and producing an electrical signal corresponding to the focusing condition of said objective lens system to the object on the basis of said output signal of the detecting means;
siad image reforming optical system including selectively changeable compensating optical means adapted for compensating the deviation of the output signal of said photoelectric detecting means caused by the difference in the imaging performances of said interchangeable lens system, said compensating optical means comprising a plurality of optical members adapted for maintaining the magnification of said second object image at a constant value inspite of the change in the imaging performance of said objective lens system, said optical members having different refractive powers from each other and each of the optical members being selectively interposed between said view finder optical means and said photoelectric detecting means in correspondence with the imaging performance of the slected lens system so as to compensate the change in the image magnification caused by the difference in the imaging performances of the lens systems.

23. A view finder adaptor unit according to claim 22, further comprising:
selecting means for selecting one of said optical members of said image reforming optical means in correspondence with the imaging performance of the selected lens system, said optical members and manually operable from outside said housing.

24. A view finder adaptor unit according to claim 23, further comprising:
indicating means electrically connected with said electrical circuit means for indicating the focusing condition of said objective lens system to the object, said indicating means being disposed at a position in which the indicating condition of the indicating means is visible from outside said housing through at least a portion of said view finder optical means.

25. A view finder adaptor unit according to claim 24, further comprising:
vibrating means for periodically moving said photoelectric detecting means in a direction substantially perpendicualr to the focal plane of said image reforming optical system, said vibrating means being operatively coupled to the detecting means.

26. An adaptor unit according to claim 21, further comprising:
vibrating means for periodically moving said photoelectric detecting means in a direction substantially perpendicular to the focal plane of said image reforming optical system, said vibrating means being operatively coupled to the detecting means.

* * * * *